United States Patent
Carey et al.

(10) Patent No.: US 7,640,818 B2
(45) Date of Patent: Jan. 5, 2010

(54) MULTI-SPEED TRANSMISSION WITH A COUNTERSHAFT GEARING

(75) Inventors: Clinton E. Carey, Monroe, MI (US); Michael B. Solt, Beverly Hills, MI (US); Boris I. Burgman, Oak Park, MI (US); Henryk Sowul, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 342 days.

(21) Appl. No.: 11/678,188

(22) Filed: Feb. 23, 2007

(65) Prior Publication Data

US 2008/0202268 A1  Aug. 28, 2008

(51) Int. Cl.
*F16H 3/08* (2006.01)
(52) U.S. Cl. ............... 74/330; 74/331; 74/340
(58) Field of Classification Search ................ 74/325, 74/329, 330, 331, 340
See application file for complete search history.

(56) References Cited

U.S. PATENT DOCUMENTS

| | | | |
|---|---|---|---|
| 6,209,407 B1 | 4/2001 | Heinzel et al. | |
| 6,958,028 B2 | 10/2005 | Janson et al. | |
| 7,021,169 B2 | 4/2006 | Kobayashi | |
| 7,225,696 B2 | 6/2007 | Gitt | |
| 7,240,578 B2 | 7/2007 | Ogami et al. | |
| 7,272,985 B2 | 9/2007 | Gumpoltsberger et al. | |
| 7,340,973 B2 | 3/2008 | Hiraiwa | |
| 7,383,749 B2 | 6/2008 | Schafer et al. | |
| 7,409,886 B2 | 8/2008 | Gitt | |
| 7,437,963 B2 | 10/2008 | Haka et al. | |
| 7,448,290 B2 | 11/2008 | Gitt | |
| 2004/0144190 A1 | 7/2004 | Hall | |
| 2005/0000307 A1 | 1/2005 | Gumpoltsberger | |
| 2005/0103140 A1* | 5/2005 | Gumpoltsberger | 74/329 |
| 2005/0115344 A1 | 6/2005 | Kim et al. | |
| 2005/0115345 A1 | 6/2005 | Gumpoltsberger et al. | |
| 2005/0193848 A1 | 9/2005 | Gitt | |
| 2005/0204840 A1 | 9/2005 | Soeda | |
| 2006/0117882 A1 | 6/2006 | Gitt | |
| 2006/0174722 A1* | 8/2006 | Terai | 74/325 |
| 2006/0219033 A1 | 10/2006 | Gitt | |
| 2006/0266141 A1* | 11/2006 | Ogami | 74/325 |
| 2006/0266144 A1 | 11/2006 | Schafer et al. | |
| 2007/0022835 A1 | 2/2007 | Kilian et al. | |
| 2007/0113696 A1 | 5/2007 | Haka et al. | |
| 2007/0180942 A1 | 8/2007 | Antonov | |
| 2008/0047378 A1 | 2/2008 | Borgerson et al. | |
| 2008/0134820 A1 | 6/2008 | Bjorck et al. | |
| 2008/0141808 A1 | 6/2008 | Gumpoltsberger | |
| 2008/0196526 A1 | 8/2008 | Singh et al. | |
| 2008/0202265 A1 | 8/2008 | Hendrickson et al. | |
| 2008/0202266 A1 | 8/2008 | Hendrickson et al. | |
| 2008/0202267 A1 | 8/2008 | Hendrickson et al. | |
| 2008/0202268 A1 | 8/2008 | Carey et al. | |

* cited by examiner

*Primary Examiner*—Roger L Pang
*Assistant Examiner*—Edwin A. Young

(57) ABSTRACT

A transmission is provided having a dual clutch, to achieve torque flow through a countershaft gearing arrangement. The countershaft gearing arrangement includes a plurality of co-planar gear sets having gears that are selectively connectable to a plurality of countershafts. At least one transfer gear set transfers torque from the counter shafts to an output shaft. The output shaft is connected to a final drive unit that has a final drive unit output shaft that is transverse to an input member connected at one end to a torque converter and at the other end to the dual clutch.

25 Claims, 7 Drawing Sheets

MULTI-SPEED TRANSMISSION WITH A COUNTERSHAFT GEARING

TECHNICAL FIELD

The invention relates to a multi-speed transmission having a countershaft gearing arrangement.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

SUMMARY

In an aspect of the present invention a powertrain having a transmission input member, a power source for generating a torque in the input member, a first intermediate shaft, a second intermediate shaft concentric with the first intermediate shaft, a clutch, countershaft, a first and second set of gears, an output shaft and a first transfer gear is provided. The clutch is selectively engagable to couple the transmission input member with one of the first and second intermediate shafts. The first set of gears are connected for common rotation with the first intermediate shaft and intermesh with a first selectable set of gears to form a first plurality of co-planar gear sets, wherein each of the gears of the first selectable set of gears is connectable for common rotation with one of the countershaft and the output shaft for selectively transferring the torque when the clutch is engaged. The second set of gears is connected for common rotation with the second intermediate shaft and intermesh with a second selectable set of gears to form a second plurality of co-planar gear sets, wherein each of the gears of the second selectable set of gears is connectable for common rotation with one of countershaft and the output shaft for selectively transferring the torque when the clutch is engaged. The output shaft is disposed radially outward of the second intermediate shaft. The first transfer gear is coupled to one of the first and second countershafts for transferring torque from the countershaft to the output shaft.

In another aspect of the present invention, the first set of gears further includes two gears.

In another aspect of the present invention, the second set of gears further comprises three gears.

In another aspect of the present invention, the powertrain further includes a first idler gear rotatable about a first idler axis and intermeshing with at least one of the selectable sets of gears of the first set of gears.

In another aspect of the present invention, the powertrain further includes a second idler gear rotatable about the idler axis and intermeshing with at least one of the selectable sets of gears of the first set of gears.

In another aspect of the present invention, the powertrain further includes a second transfer gear connected for common rotation with one of the first and second countershafts and intermeshing with an output gear connected for common rotation with the output shaft for transferring torque from the countershaft to the output shaft.

In another aspect of the present invention, the powertrain further includes a plurality of synchronizers for selectively connecting the first and second set of selectable sets of gears to at least one of the countershafts.

In another aspect of the present invention, the powertrain further includes a final drive unit wherein the final drive unit has an output shaft that is perpendicular to the input member.

In another aspect of the present invention, the clutch is a dual clutch having a first hub connected to the first intermediate shaft and a second hub connected to the second intermediate shaft.

In another aspect of the present invention, the clutch is disposed between the first and second plurality of co-planar gear sets.

In another aspect of the present invention, the powertrain further includes a second clutch for selectively connecting at least one of the first and second selectable set of gears to at least one of the countershafts.

In another aspect of the present invention, the powertrain further includes a third clutch for selectively connecting at least one of the first and second selectable set of gears to at least one of the countershafts.

In another aspect of the present invention, the one of the second plurality of co-planar gear sets that transfers the torque to achieve the first forward gear ratio is disposed adjacent a structural wall of the housing of the powertrain.

In another aspect of the present invention, the one of the second plurality of co-planar gear sets that transfers the torque to achieve the seventh forward gear ratio is disposed adjacent a structural wall of the housing of the powertrain.

The above features and advantages and other features and advantages of the present invention are readily apparent from the following detailed description of the best modes for carrying out the invention when taken in connection with the accompanying drawings.

DESCRIPTION

Figure 1:
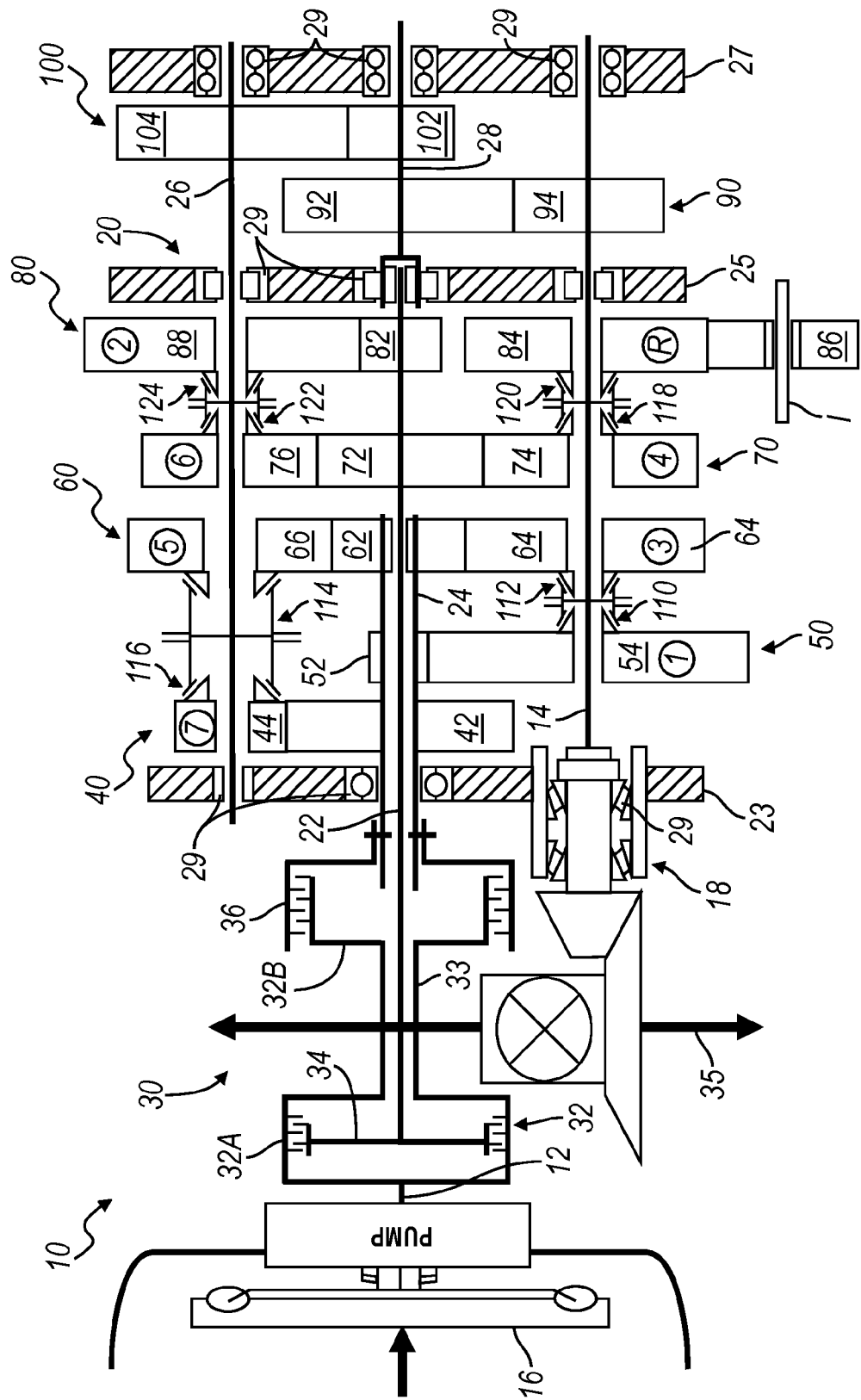
FIG. 1 is a schematic representation of a first embodiment of a transmission in accordance with the invention.

Referring to the drawings, wherein like reference numbers refer to like components, in FIG. 1 a multi-speed transmission 10 is depicted. The transmission 10 includes an input member 12 and output member 14. In the present embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The transmission 10 includes a countershaft gearing arrangement 20 that includes intermediate shafts, a countershaft, co-planar intermeshing gear sets and selectively engagable synchronizers as will be described herein. For instance, the countershaft gearing arrangement 20 includes a first intermediate shaft 22 and a second intermediate shaft 24, which is a sleeve shaft concentric with the first intermediate shaft 22. The countershaft gearing arrangement 20 further includes a countershaft 26. The countershaft 26 is both spaced from and parallel with the input shaft 12, the output shaft 14 and the intermediate shafts 22, 24. Further still countershaft gearing arrangement 20 includes a transfer gear shaft 28 for rotatably supporting a plurality of transfer gears, as will be described in further detail below. Transfer gear shaft 28 is coaxial with first intermediate shaft 22.

The first and second intermediate shafts 22, 24, countershaft 26 transfer gear shaft 28, and output shaft 14 are supported by a first, second and third support structure or wall 23, 25, 27 formed in the housing of transmission 10. As conventionally known, the walls 23, 25, 27 are fitted with bearings 29 for rotatably supporting the first and second intermediate shafts 22, 24, countershafts 26 and output shaft 14. Wall 23 is disposed closest to the torque converter 16 and the final drive unit 18. Wall 25 is disposed adjacent wall 23 and wall 27 is disposed adjacent wall 25. Wall 27 is for example a rear wall of the transmission 10.

A dual clutch 30 is connected between input shaft 12 and first and second intermediate shafts 22, 24. The dual clutch 30 includes a clutch housing 32 connected for common rotation with input shaft 12. Clutch housing 32 has a first clutch portion 32a and a second clutch portion 32b connected by a housing shaft 33. Housing shaft 33, for example, is a sleeve shaft that is concentric with first intermediate shaft 22 and may be welded or otherwise connected to first and second clutch portions 32a, 32b or integrally formed therewith. Housing shaft 33 allows first and second clutch portions 32a, 32b to be positioned remote from each other to provide packaging clearance for transverse extending shafts, drivelines and like members 35 coupled to final drive unit 18. Further, clutch 30 has a first and a second clutch element or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further, clutch element 34 is connected for common rotation with first intermediate shaft 22 and clutch element 36 is connected for common rotation with second intermediate shaft 24. Thus, selective engagement of clutch element 34 with clutch housing 32, connects the input shaft 12 for common rotation with first intermediate shaft 22 and selective engagement of clutch element 36 with clutch housing 32, connects the input shaft 12 for common rotation with second intermediate shaft 24.

The countershaft gearing arrangement 20 also includes co-planar, intermeshing gear sets 40, 50, 60, 70, 80, 90 and 100. Gear set 40 includes co-planar, intermeshing gears 42 and 44. Gear 42 is connected for common rotation with second intermediate shaft 24. Gear 42 intermeshes with gear 44. Gear 44 is selectively connectable for common rotation with countershaft 26. As shown in FIG. 1, gear set 40 is disposed adjacent wall 23 and provides a seventh gear ratio.

Gear set 50 includes co-planar, intermeshing gears 52 and 54. Gear 52 is connected for common rotation with second intermediate shaft 24. Gear 52 intermeshes with gear 54. Gear 54 is selectively connectable for common rotation with the output shaft 14. As shown in FIG. 1, gear set 50 is disposed adjacent gear set 40 and provides a first gear ratio.

Gear set 60 includes co-planar, intermeshing gears 62, 64 and 66. Gear 62 is connected for common rotation with second intermediate shaft 24. Gear 62 intermeshes with gear 64, which is selectively connectable for common rotation with output shaft 14. Gear 62 also intermeshes with gear 66, which is selectively connectable for common rotation with countershaft 26. As shown in FIG. 1, gear set 60 is disposed adjacent gear set 50 and provides third and fifth gear ratios.

Gear set 70 includes co-planar, intermeshing gears 72, 74 and 76. Gear 72 is connected for common rotation with first intermediate shaft 22. Gear 72 intermeshes with both gear 74 and gear 76. Gear 74 is selectively connectable for common rotation with the output shaft 14. Gear 76 is selectively connectable for common rotation with the countershaft 26. As shown in FIG. 1, gear set 70 is disposed adjacent gear set 60 and provides fourth and sixth gear ratios.

Gear set 80 includes co-planar intermeshing gears 82, 84, 86 and 88. Gear 82 is connected for common rotation with first intermediate shaft 22 and intermeshes with idler gear 86 and gear 88. Idler gear 86 is rotatable about idler axis I. Gear 86 also intermeshes with gear 84. Gear 84 is selectively connectable with output shaft 14. Gear 88 is selectively connectable with countershaft 26. As shown in FIG. 1, gear set 80 is disposed adjacent gear set 70 and wall 25 and provides a second and reverse gear ratios.

Gear set 90 is a transfer gear set that includes transfer gears 92 and 94. Transfer gear 92 is connected for common rotation with a transfer gear shaft 28 and intermeshes with gear 94. Transfer gear 94 is connected for common rotation with output shaft 14. As shown in FIG. 1, gear set 90 is disposed between walls 25 and 27 and transfers torque from transfer gear shaft 28 to output shaft 14.

Co-planar gear set 100 is a transfer gear set that includes transfer gears 102 and gear 104. Transfer gear 102 is connected for common rotation with transfer gear shaft 28 and intermeshes with gear 104. Transfer gear 104 is connected for common rotation with output shaft 14. As shown in FIG. 1, gear set 100 is disposed adjacent gear set 90 and transfers torque from transfer gear shaft 28 to output shaft 14.

The transmission 10 further includes a plurality of selectively engagable synchronizers 110, 112, 114, 116, 118, 120, 122 and 124. Synchronizers 110/112, 114/116, 118/120 and 122/124 are a left and right side of synchronizer assemblies, sharing a common synchronizer hub and sleeve. Synchronizer 110 is selectively engagable to connect gear 54 with output shaft 14 for common rotation therewith. Synchronizer 112 is selectively engagable to connect gear 64 with output shaft 14 for common rotation therewith. Synchronizer 114 is selectively engagable to connect gear 66 with countershaft 26 for common rotation therewith. Synchronizer 116 is selectively engagable to connect gear 44 with countershaft 26 for common rotation therewith. Synchronizer 118 is selectively engagable to connect gear 74 with output shaft 14 for common rotation therewith. Synchronizer 120 is selectively engagable to connect gear 84 with output shaft 14 for common rotation therewith. Synchronizer 122 is selectively engagable to connect gear 76 with countershaft 26 for common rotation therewith. Synchronizer 124 is selectively engagable to connect gear 88 with countershaft 26 for common rotation therewith.

The transmission 10 is capable of transmitting torque from the input shaft 12 to the output shaft 14 in at least seven forward torque ratios and one reverse torque ratio. Each of the forward torque ratios and the reverse torque ratio is attained by engagement of dual clutch 30 and one of the clutch elements 34, 36 and one or more of the synchronizers 110, 112, 114, 116, 118, 120, 122 and 124. Those skilled in the art will readily understand that a different speed ratio is associated with each torque ratio.

To establish the reverse torque ratio clutch element 34 of the dual clutch 30 and synchronizer 120 are engaged. By the engagement of clutch element 34 of the dual clutch 30, torque is transferred from the input shaft 12 through clutch housing 32 to the first intermediate shaft 22. Further, torque is transferred from the first intermediate shaft 22 through gear 82 to idler gear 86. Idler gear 86 transfers the torque to gear 84. Upon engagement of synchronizer 120, gear 84 transfers torque to output shaft 14. Output shaft 14 transfers the torque to the final drive unit 18.

A first forward torque ratio ($1^{st}$ gear) is achieved by engaging clutch element 36 of the dual clutch 30 and synchronizer 110. By the engagement of clutch element 36 of the dual clutch 30, torque is transferred from input shaft 12 through clutch housing 32 to the second intermediate shaft 24. Further, torque is transferred from the second intermediate shaft 24 to gear 52. Gear 52 transfers the torque to gear 54. Upon engagement of synchronizer 110, gear 54 transfers torque to output shaft 14. Output shaft 14 transfers the torque to the final drive unit 18.

A subsequent forward torque ratio ($2^{nd}$ gear) is established by engagement of clutch element 34 of the dual clutch 30 and synchronizer 124. By the engagement of clutch element 34 of the dual clutch 30, torque is transferred from input shaft 12 through clutch housing 32 to the first intermediate shaft 22. Further, torque is transferred from the first intermediate shaft 22 to gear 82. Gear 82 transfers the torque to gear 88. Upon engagement of synchronizer 124, gear 88 transfers torque to countershaft 26. Countershaft 26 transfers the torque to transfer gear 104. Gear 104 transfers torque to transfer gear 102, which in turn transfers the torque to transfer gear shaft 28. Transfer gear shaft 28 transfers the torque to transfer gear 92. Transfer gear 92 transfers the torque to transfer gear 94. Transfer gear 94 transfers the torque to output shaft 14. Output shaft 14 transfers the torque to the final drive unit 18.

The subsequent torque ratio ($3^{rd}$ gear) is established by engagement of clutch element 36 of the dual clutch 30 and synchronizer 112. By the engagement of clutch element 36 of the dual clutch 30, torque is transferred from input shaft 12 through clutch housing 32 to the second intermediate shaft 24. Further, torque is transferred from the second intermediate shaft 24 to gear 62. Gear 62 transfers the torque to gear 64. Upon engagement of synchronizer 112, gear 64 transfers torque to output shaft 14. Output shaft 14 transfers the torque to the final drive unit 18.

The next subsequent forward torque ratio ($4^{th}$ gear) is established by engagement of clutch element 34 of the dual clutch 30 and synchronizer 118. By the engagement of clutch element 34 of the dual clutch 30, torque is transferred from input shaft 12 through clutch housing 32 to the first intermediate shaft 22. Further, torque is transferred from the first intermediate shaft 22 to gear 72. Gear 72 transfers the torque to gear 74. Upon engagement of synchronizer 118, gear 74 transfers torque to output shaft 14. Output shaft 14 transfers the torque to the final drive unit 18.

The subsequent torque ratio ($5^{th}$ gear) is established by engagement of clutch element 36 of the dual clutch 30 and synchronizer 114. By the engagement of clutch element 36 of the dual clutch 30, torque is transferred from input shaft 12 through clutch housing 32 to the second intermediate shaft 24. Further, torque is transferred from the second intermediate shaft 24 to gear 62. Gear 62 transfers the torque to gear 66. Upon engagement of synchronizer 114, gear 66 transfers torque to countershaft 26. Countershaft 26 transfers the torque to transfer gear 104. Gear 104 transfers torque to transfer gear 102, which in turn transfers the torque to transfer gear shaft 28. Transfer gear shaft 28 transfers the torque to transfer gear 92. Transfer gear 92 transfers the torque to transfer gear 94. Transfer gear 94 transfers the torque to output shaft 14. Output shaft 14 transfers the torque to the final drive unit 18.

A subsequent forward torque ratio ($6^{th}$ gear) is established by engagement of clutch element 34 of the dual clutch 30 and synchronizer 122. By the engagement of clutch element 34 of the dual clutch 30, torque is transferred from input shaft 12 through clutch housing 32 to the first intermediate shaft 22. Further, torque is transferred from the first intermediate shaft 22 to gear 72. Gear 72 transfers the torque to gear 76. Upon engagement of synchronizer 122, gear 76 transfers torque to countershaft 26. Countershaft 26 transfers the torque to transfer gear 104. Gear 104 transfers torque to transfer gear 102, which in turn transfers the torque to transfer gear shaft 28. Transfer gear shaft 28 transfers the torque to transfer gear 92. Transfer gear 92 transfers the torque to transfer gear 94. Transfer gear 94 transfers the torque to output shaft 14. Output shaft 14 transfers the torque to the final drive unit 18.

The subsequent torque ratio ($7^{th}$ gear) is established by engagement of clutch element 36 of the dual clutch 30 and synchronizer 116. By the engagement of clutch element 36 of the dual clutch 30, torque is transferred from input shaft 12 through clutch housing 32 to the second intermediate shaft 24. Further, torque is transferred from the second intermediate shaft 24 to gear 42. Gear 42 transfers the torque to gear 44. Upon engagement of synchronizer 116, gear 44 transfers torque to countershaft 26. Countershaft 26 transfers the torque to transfer gear 104. Gear 104 transfers torque to transfer gear 102, which in turn transfers the torque to transfer gear shaft 28. Transfer gear shaft 28 transfers the torque to transfer gear 92. Transfer gear 92 transfers the torque to transfer gear 94. Transfer gear 94 transfers the torque to output shaft 14. Output shaft 14 transfers the torque to the final drive unit 18.

The present invention contemplates that a variety of torque ratios (i.e., the ratio of torque of the output shaft 14 to the input shaft 12) are achievable through the selection of tooth counts of the gears of the transmission 10. Moreover, the present invention advantageously provides the transfer gears 92, 94 in one plane and transfer gears 102, 104 in another plane. This arrangement provides the opportunity to achieve the desired gear ratios. Further, flexibility is provided in the selection of gear ratios with respect to $1^{st}$ gear and $7^{th}$ gear, as the gears (42, 44, 52 and 54) that provide these ratios are disposed in two separate planes. An overall transmission length reduction is achieved through the use of idler gear 86.

Second Embodiment

Figure 2:
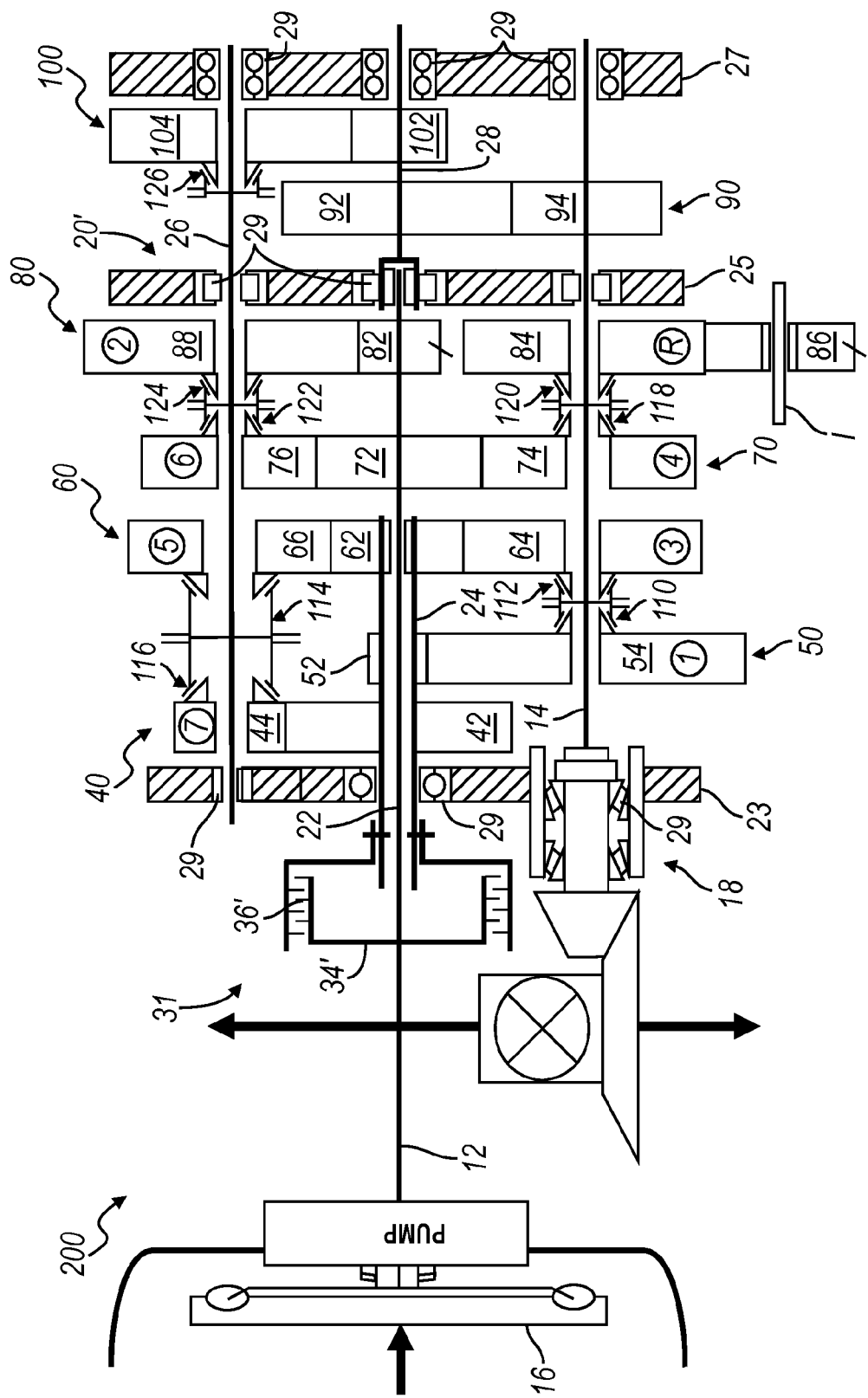
FIG. 2 is a schematic representation of a second embodiment of a transmission in accordance with the invention.

Referring to FIG. 2 a multi-speed transmission 200 is depicted. The transmission 200 includes input member 12 and output member 14 as described in the first embodiment. The input shaft 12 is continuously connected with the torque converter 16 or other starting device. An engine (not shown) is connected to and provides the driving torque to the torque converter 16. The output shaft 14 is continuously connected with the final drive unit 18, as described previously with respect to the first embodiment.

Moreover, transmission 200 includes a countershaft gearing arrangement 20' that includes the same intermediate shafts, countershaft, transfer gear shaft, co-planar intermeshing gear sets and selectively engagable synchronizers as described above with respect to countershaft gearing arrangement 20 with the exception of the attachment of transfer gear 104 to countershaft 26 and the addition of an engagable synchronizer 126. More specifically, synchronizer 126 provides selective engagement of transfer gear 104 to countershaft 26

As in the previous embodiment, the first and second intermediate shafts 22, 24, countershaft 26, transfer shaft 28 and output shaft 14 are supported by first, second and third support structures or walls 23, 25, 27 formed in the housing of transmission 200. As conventionally known, the walls 23, 25, 27 are fitted with bearings 29 for rotatably supporting the first and second intermediate shafts 22, 24, countershafts 26, transfer gear shaft 28 and output shaft 14. Wall 23 is disposed closest to the torque converter 16 and the final drive unit 18. Wall 25 is disposed adjacent wall 23 and wall 27 is disposed adjacent wall 25.

A clutch 31 is connected between input shaft 12 and first and second intermediate shafts 22, 24. Further, clutch 31 has a clutch elements or hubs 34' and 36'. Clutch element 34' and 36' are configured to form a friction clutch, as well known in the art. More specifically, clutch elements 34', 36' have friction plates mounted thereon that interact to form a friction clutch. Further, clutch element 34' is connected for common rotation with first intermediate shaft 22 and input shaft 12 and clutch element 36' is connected for common rotation with second intermediate shaft 24. Thus, selective engagement of clutch element 34' with clutch element 36', connects the input shaft 12 for common rotation with second intermediate shaft 24.

The transmission 200 is capable of transmitting torque from the input shaft 12 to the output shaft 14 in at least seven forward torque ratios and one reverse torque ratio, as indicated in FIG. 2. Each of the forward torque ratios and the reverse torque ratio is attained by engagement of clutch 31 and one of the clutch elements 34', 36' and one or more of the synchronizers 110, 112, 114, 116, 118, 120, 122, 124 and 126. Those skilled in the art will readily understand that a different speed ratio is associated with each torque ratio and how these torque ratios are achieved, based on the description of transmission 10.

Third Embodiment

Figure 3:
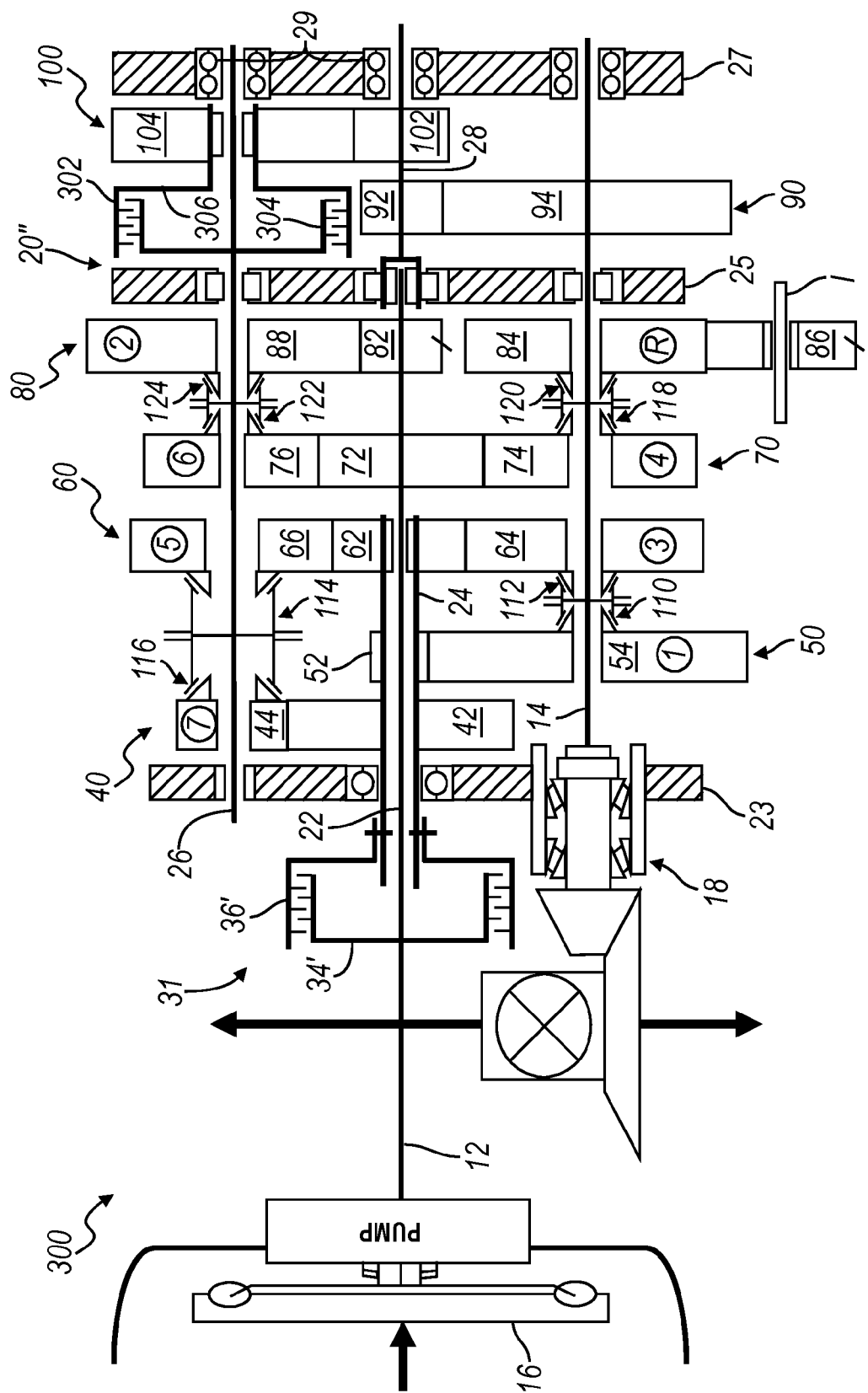
FIG. 3 is a schematic representation of a third embodiment of a transmission in accordance with the invention.

Referring to FIG. 3 a multi-speed transmission 300 is depicted. The transmission 300 includes input member 12 and output member 14 as described in the first embodiment. The input shaft 12 is continuously connected with the torque converter 16 or other starting device. An engine (not shown) is connected to and provides the driving torque to the torque converter 16. The output shaft 14 is continuously connected with the final drive unit 18, as described previously with respect to the first embodiment.

Moreover, transmission 300 includes a countershaft gearing arrangement 20" that includes the same intermediate shafts 22, 24, countershaft 26, transfer gear shaft 28, co-planar intermeshing gear sets 40, 50, 60, 70, 80, 90 and 100 and selectively engagable synchronizers as described above with respect to countershaft gearing arrangement 20 with the following exception. Transfer gear 104 is selectively engagable to countershaft 26 through a friction clutch 302. More specifically, friction clutch 302 is disposed between wall 25 and gear set 100. Further, clutch 302 has clutch elements or hubs 304 and 306. Clutch element 304 and 306 are configured to form a friction clutch, as well known in the art. More specifically, clutch elements 304, 306 have friction plates mounted thereon that interact to form a friction clutch. Further, clutch element 304 is connected for common rotation with countershaft 26 and clutch element 306 is connected for common rotation with transfer gear 104. Thus, selective engagement of clutch element 304 with clutch element 306 connects transfer gear 104 with countershaft 26 for common rotation therewith.

As in the previous embodiment, the first and second intermediate shafts 22, 24, countershaft 26, transfer shaft 28 and output shaft 14 are supported by first, second and third support structures or walls 23, 25, 27 formed in the housing of transmission 200. As conventionally known, the walls 23, 25, 27 are fitted with bearings 29 for rotatably supporting the first and second intermediate shafts 22, 24, countershafts 26, transfer gear shaft 28 and output shaft 14. Wall 23 is disposed closest to the torque converter 16 and the final drive unit 18. Wall 25 is disposed adjacent wall 23 and wall 27 is disposed adjacent wall 25.

In the present embodiment, transmission 300 has clutch 31 as described in the second embodiment connected between input shaft 12 and first and second intermediate shafts 22, 24. Further, clutch 31 has a clutch elements or hubs 34' and 36'. Further, clutch element 34' is connected for common rotation with first intermediate shaft 22 and input shaft 12 and clutch element 36' is connected for common rotation with second intermediate shaft 24. Thus, selective engagement of clutch element 34' with clutch element 36', connects the input shaft 12 for common rotation with second intermediate shaft 24.

The transmission 300 is capable of transmitting torque from the input shaft 12 to the output shaft 14 in at least seven forward torque ratios and one reverse torque ratio, as indicated in FIG. 3. Each of the forward torque ratios and the reverse torque ratio is attained by engagement of clutches 31 and 302 and one or more of the clutch elements 34', 36' and 304, 306 and one or more of the synchronizers 110, 112, 114, 116, 118, 120, 122 and 124. Those skilled in the art will readily understand that a different speed ratio is associated with each torque ratio and how these torque ratios are achieved, based on the description of transmission 10.

Fourth Embodiment

Figure 4:
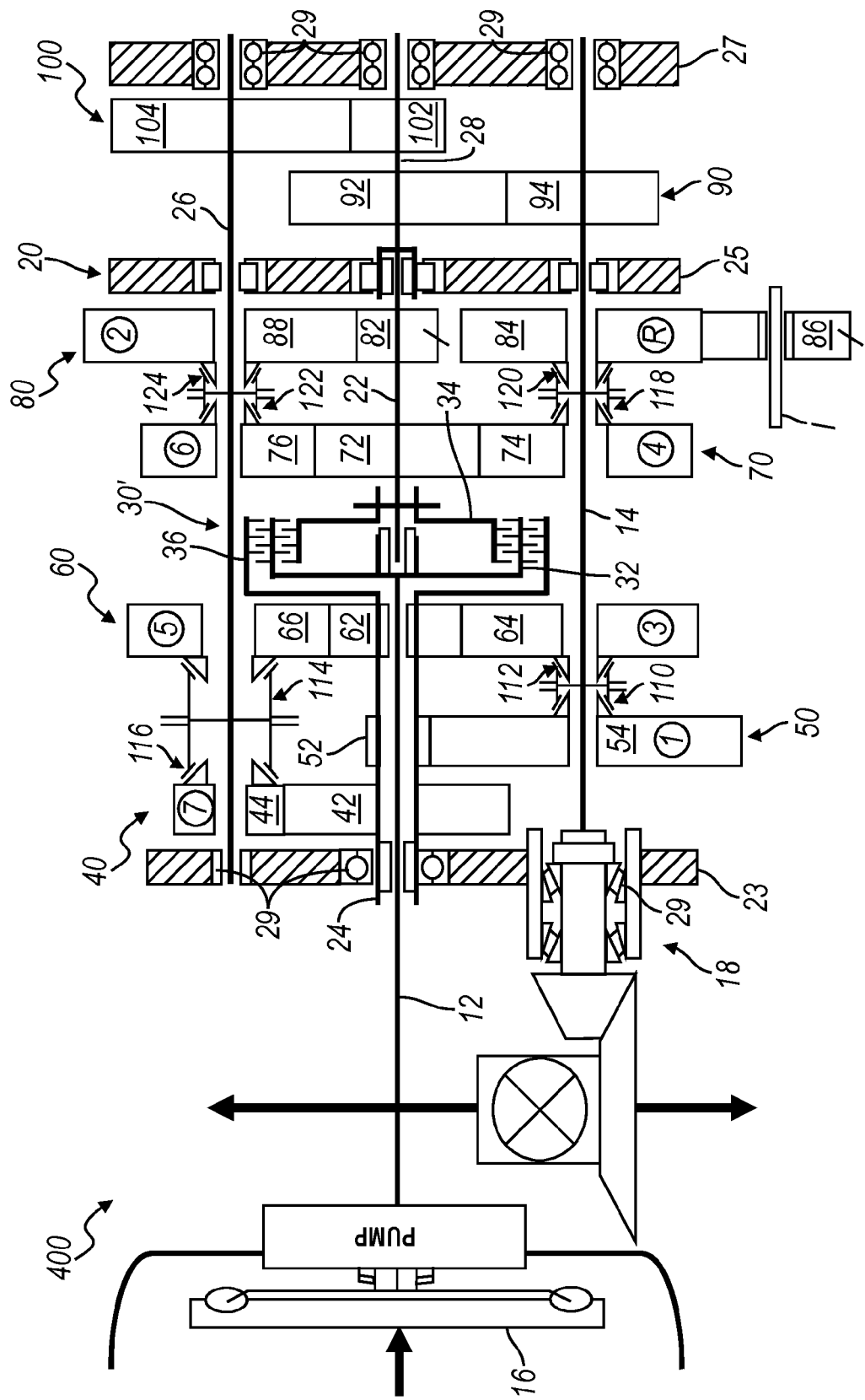
FIG. 4 is a schematic representation of a fourth embodiment of a transmission in accordance with the invention.

Referring to FIG. 4, a multi-speed transmission 400 is depicted. The transmission 400 includes an input member 12 and output member 14. The input shaft 12 is continuously connected with an engine (not shown). The output shaft 14 is continuously connected with the final drive unit 18. The transmission 400 includes the countershaft gearing arrangement 20 that includes intermediate shafts 22 and 24, countershaft 26, transfer gear shaft 28, co-planar intermeshing gear sets 40, 50, 60, 70, 80, 90 and 100 and selectively engagable synchronizers, as described above with respect to the previous embodiment.

For instance, the countershaft gearing arrangement 20 includes a first intermediate shaft 22 and a second intermediate shaft 24. However, in the present embodiment second intermediate shaft 24 is a sleeve shaft that is concentric with input shaft 12. Further, in the present embodiment a dual clutch 30' is positioned between co-planar gear sets. For example dual clutch 33 is positioned between gear set 70 and gear set 80. Dual clutch 30' is connected between input shaft 12 and first and second intermediate shafts 22, 24. The dual clutch 30' includes a clutch housing 32 connected for common rotation with input shaft 12. Further, clutch 30' has first and second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further, clutch element 34 is connected for common rotation with first intermediate shaft 22 and clutch element 36 is connected for common rotation with second intermediate shaft 24. Thus, selective engagement of clutch element 34 with clutch housing 32, connects the input shaft 12 for common rotation with first intermediate shaft 22 and selective engagement of clutch element 36 with clutch housing 32, connects the input shaft 12 for common rotation with second intermediate shaft 24.

As in the previous embodiments, first and second intermediate shafts 22, 24, countershafts 26, transfer gear shaft 28 and output shaft 14 are supported by first, second and third support structures or walls 23, 25, 27 formed in the housing of transmission 400. As conventionally known, the walls 23, 25, 27 are fitted with bearings 29 for rotatably supporting the first and second intermediate shafts 22, 24, countershafts 26, transfer gear shaft 28 and output shaft 14. Wall 23 is disposed closest to the torque converter 16 and the final drive unit 18. Wall 25 is disposed adjacent wall 23 and wall 27 is disposed adjacent wall 25.

The transmission 400 is capable of transmitting torque from the input shaft 12 to the output shaft 14 in at least seven forward torque ratios and one reverse torque ratio, as indicated in FIG. 4. Each of the forward torque ratios and the reverse torque ratio is attained by engagement of clutch 30' and one of the clutch elements 34, 36 and one or more of the synchronizers 110, 112, 114, 116, 118, 120, 122 and 124. Those skilled in the art will readily understand that a different speed ratio is associated with each torque ratio and how these torque ratios are achieved, based on the description of transmission 10.

Fifth Embodiment

Figure 5:
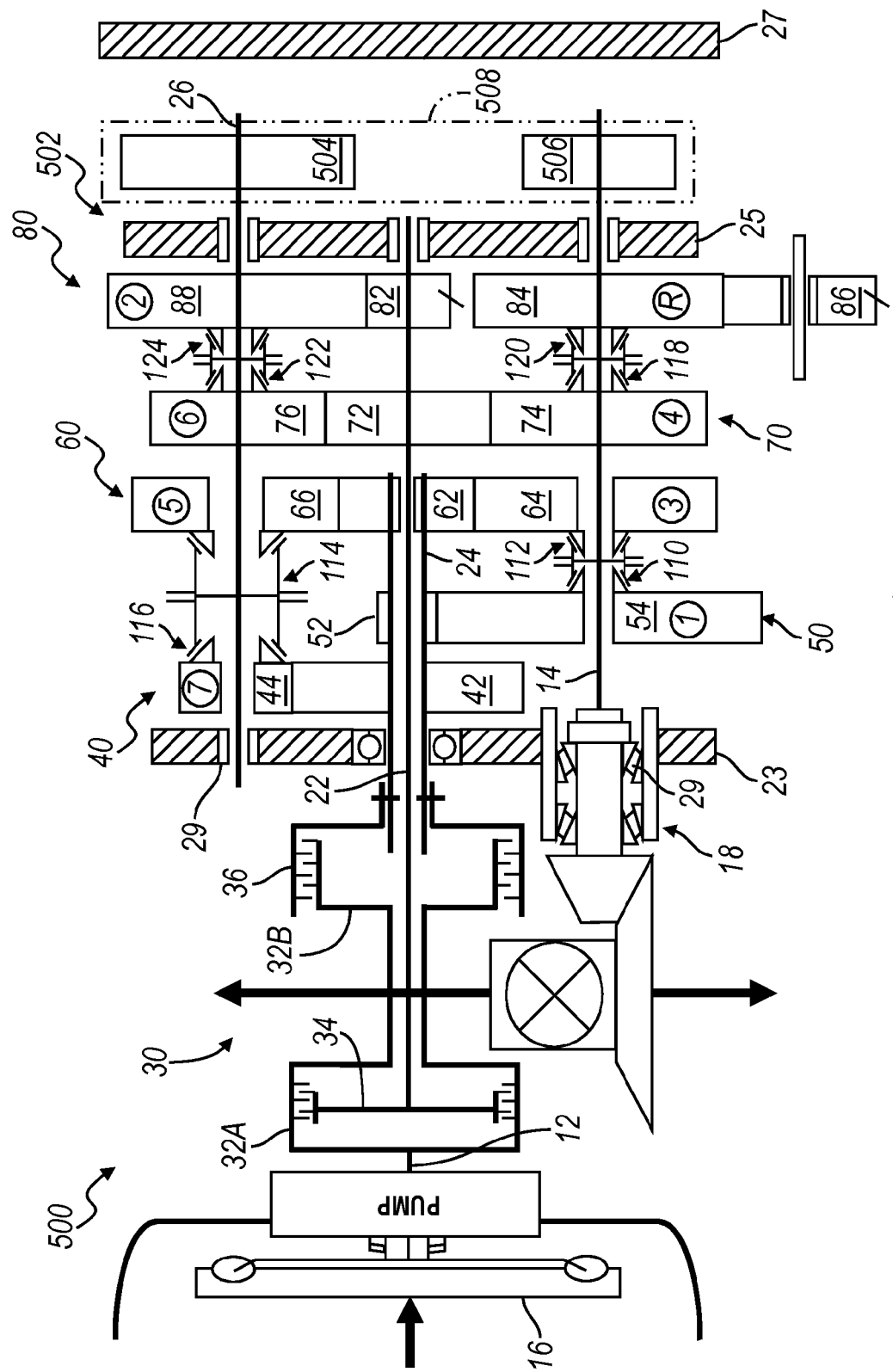
FIG. 5 is a schematic representation of a fifth embodiment of a transmission in accordance with the invention.

Referring to FIG. 5 a multi-speed transmission 500 is depicted. The transmission 500 includes input member 12 and output member 14 as described in the first embodiment. The input shaft 12 is continuously connected with the torque converter 16 or other starting device. An engine (not shown) is connected to and provides the driving torque to the torque converter 16. The output shaft 14 is continuously connected with the final drive unit 18, as described previously with respect to the first embodiment.

Moreover, transmission 500 includes a countershaft gearing arrangement 502 that includes the same intermediate shafts 22, 24, countershaft 26, co-planar intermeshing gear sets 40, 50, 60, 70, and 80 and selectively engagable synchronizers as described above with respect to countershaft gearing arrangement 20. However, in the present embodiment transfer gear shaft 28 and transfer gear sets 90 and 100 have been eliminated and replaced with a drive sprocket 504 and a driven sprocket 506 and transfer chain or belt 508. More specifically, drive sprocket 504 transfers torque from the countershaft 26 to transfer chain 508. Transfer chain 508 transfers the torque to the driven sprocket 506. The driven sprocket 506 transfers the torque to the output shaft 14.

As in the previous embodiment, the first and second intermediate shafts 22, 24, countershaft 26 and output shaft 14 are supported by first, second and third support structures or walls 23, 25, 27 formed in the housing of transmission 500. Wall 23 is disposed closest to the torque converter 16 and the final drive unit 18. Wall 25 is disposed adjacent wall 23 and wall 27 is disposed adjacent wall 25. Drive sprocket 504, driven sprocket 506 and transfer chain 508 are disposed between walls 25 and 27.

The dual clutch 30 as described with respect to the first embodiment shown FIG. 1 is also provided in the present embodiment. Moreover, the connections with respect to the input shaft 12 and intermediate shafts 22, 24 and the hubs 34 and 36 of dual clutch 30 are the same as described in the first embodiment.

Accordingly, transmission 500 is capable of transmitting torque from the input shaft 12 to the output shaft 14 in at least seven forward torque ratios and one reverse torque ratio, as indicated in FIG. 5. Each of the forward torque ratios and the reverse torque ratio is attained by engagement of clutch 30 and one of the clutch elements 34, 36 and one or more of the synchronizers 110, 112, 114, 116, 118, 120, 122, and 124. Those skilled in the art will readily understand that a different speed ratio is associated with each torque ratio and how these torque ratios are achieved, based on the description of transmission 10.

Sixth Embodiment

Figure 6:
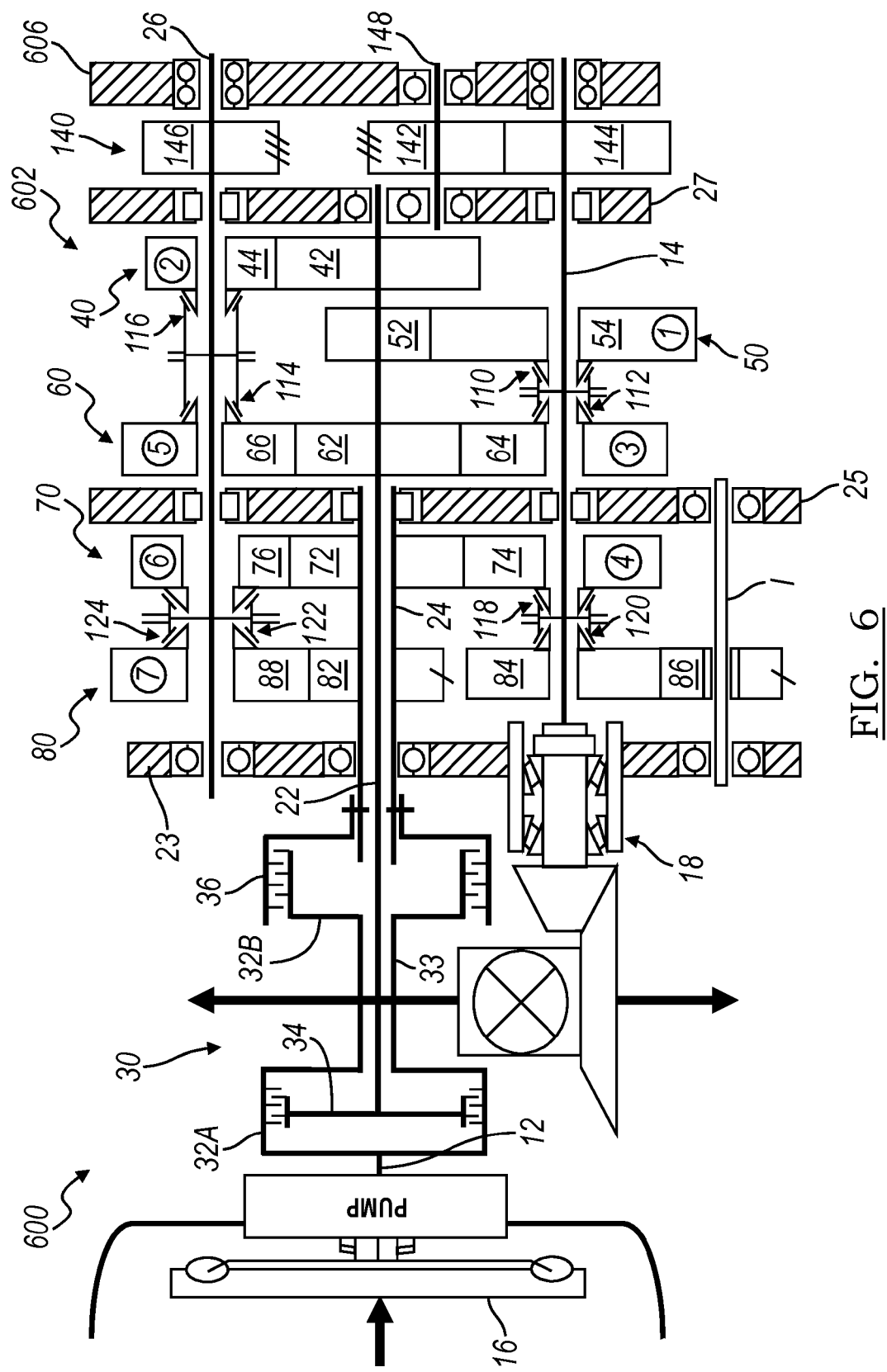
FIG. 6 is a schematic representation of a sixth embodiment of a transmission in accordance with the invention.

Referring to FIG. 6 a multi-speed transmission 600 is depicted. The transmission 600 includes an input member 12 and an output member 14. In this embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The transmission 600 includes the dual clutch 30 having clutch elements 34 and 36, as described in the first embodiment and illustrated in FIG. 1.

Further, a countershaft gearing arrangement 602 is provided that includes the first and second intermediate shafts 22, 24, countershaft 26 and output shaft 14, as described with respect to the first embodiment. Still further, countershaft gearing arrangement 602 includes co-planar, intermeshing gear sets 40, 50, 60, 70, 80 and 140. Gear set 40 includes co-planar, intermeshing gears 42 and 44. Gear 42 is connected for common rotation with first intermediate shaft 22. Gear 42 intermeshes with gear 44. Gear 44 is selectively connectable for common rotation with countershaft 26. As shown in FIG. 6, gear set 40 is disposed adjacent wall 27 and provides a second gear ratio.

Gear set 50 includes co-planar, intermeshing gears 52 and 54. Gear 52 is connected for common rotation with first intermediate shaft 22. Gear 52 intermeshes with gear 54. Gear 54 is selectively connectable for common rotation with the output shaft 14. As shown in FIG. 6, gear set 50 is disposed adjacent gear set 40 and provides a first gear ratio.

Gear set 60 includes co-planar, intermeshing gears 62, 64 and 66. Gear 62 is connected for common rotation with second intermediate shaft 24. Gear 62 intermeshes with gear 64, which is selectively connectable for common rotation with output shaft 14. Gear 62 also intermeshes with gear 66, which is selectively connectable for common rotation with countershaft 26. As shown in FIG. 6, gear set 60 is disposed adjacent gear set 50 and wall 25 and provides a third and fifth gear ratio.

Gear set 70 includes co-planar, intermeshing gears 72, 74 and 76. Gear 72 is connected for common rotation with second intermediate shaft 24. Gear 72 intermeshes with both gear 74 and gear 76. Gear 74 is selectively connectable for common rotation with the output shaft 14. Gear 76 is selectively connectable for common rotation with the countershaft 26. As shown in FIG. 6, gear set 70 is disposed adjacent wall 25 and provides the fourth and sixth gear ratios.

Gear set 80 includes co-planar intermeshing gears 82, 84, 86 and 88. Gear 82 is connected for common rotation with second intermediate shaft 24 and intermeshes with idler gear 86 and gear 88. Idler gear 86 is rotatable about idler axis I. Gear 86 also intermeshes with gear 84. Gear 84 is selectively connectable with output shaft 14. Gear 88 is selectively connectable with countershaft 26. As shown in FIG. 6, gear set 80 is disposed adjacent gear set 70 and wall 23 and provides a seventh and reverse gear ratios.

Gear set 140 is a transfer gear set that includes transfer gears 142, 144 and 146 disposed between wall 27 and a wall 606 of the transmission housing. Transfer gear 142 is connected for common rotation with a transfer gear shaft 148 and intermeshes with both gears 144 and 146. Transfer gear shaft 148 is both parallel to and spaced from first intermediate shaft 22. Transfer gear shaft 148 is rotatably supported by wall 27 and wall 606 of the transmission housing. Transfer gear 144 is connected for common rotation with output shaft 14. connected for common rotation with output shaft 14. Transfer gear 146 is connected for common rotation with countershaft 26. As shown in FIG. 6, gear set 140 is configured to transfer torque from countershaft 26 to output shaft 14.

The transmission 10 further includes a plurality of selectively engagable synchronizers 110, 112, 114, 116, 118, 120, 122 and 124. Synchronizers 110/112, 114/116, 118/120 and 122/124 are a left and right side of synchronizer assemblies, sharing a common synchronizer hub and sleeve. Synchronizer 110 is selectively engagable to connect gear 54 with output shaft 14 for common rotation therewith. Synchronizer 112 is selectively engagable to connect gear 64 with output shaft 14 for common rotation therewith. Synchronizer 114 is selectively engagable to connect gear 66 with countershaft 26 for common rotation therewith. Synchronizer 116 is selectively engagable to connect gear 44 with countershaft 26 for common rotation therewith. Synchronizer 118 is selectively engagable to connect gear 74 with output shaft 14 for common rotation therewith. Synchronizer 120 is selectively engagable to connect gear 84 with output shaft 14 for common rotation therewith. Synchronizer 122 is selectively engagable to connect gear 76 with countershaft 26 for common rotation therewith. Synchronizer 124 is selectively engagable to connect gear 88 with countershaft 26 for common rotation therewith.

The transmission 600 is capable of transmitting torque from the input shaft 12 to the output shaft 14 in at least seven forward torque ratios and one reverse torque ratio, as indicated in FIG. 6. Each of the forward torque ratios and the reverse torque ratio is attained by engagement of clutch 30 and one of the clutch elements 34, 36 and one or more of the synchronizers 110, 112, 114, 116, 118, 120, 122 and 124. Those skilled in the art will readily understand that a different speed ratio is associated with each torque ratio and how these torque ratios are achieved, based on the description of transmission 10.

Seventh Embodiment

Figure 7:
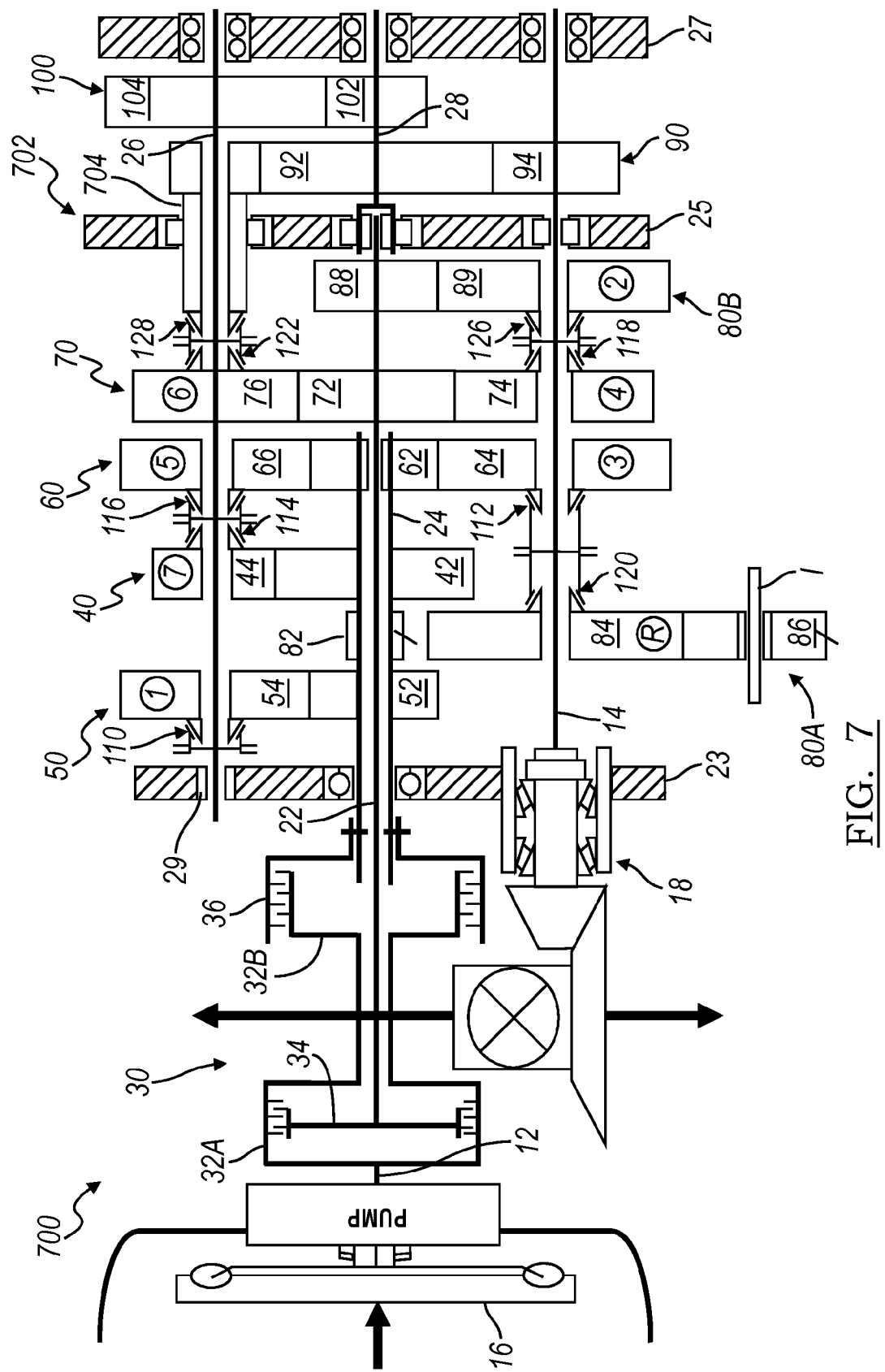
FIG. 7 is a schematic representation of a seventh embodiment of a transmission in accordance with the invention.

Referring to FIG. 7 a multi-speed transmission 700 is depicted. The transmission 700 includes an input member 12 and an output member 14. In this embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. Moreover the present embodiment includes the supporting walls 23, 25, and 27 as described with respect to the previous embodiments.

The transmission 700 includes a countershaft gearing arrangement 702 that includes the same intermediate shafts 22, 24, countershaft 26, transfer gear shaft 28 and selectively engagable synchronizers 110 through 122 and dual clutch 30, as described above with respect to the first embodiment shown in FIG. 1. Further, countershaft gearing arrangement 702 includes the same co-planar intermeshing gear sets (i.e. 40, 60, 70, 90 and 100) as the first embodiment with the exception of gear sets 50, and 80A and 80B. The location of the co-planar gear set relative to the supporting walls 23, 25 and 27 are as follows: gear set 50 is adjacent wall 23, gear set 80A is adjacent gear set 50, gear set 40 is adjacent gear set 80A, gear set 60 is adjacent gear set 40, gear set 70 is adjacent gear set 60, gear set 80B is adjacent gear set 70 and wall 25. The connections of the other co-planar gear sets 40, 60, 70, 90, and 100 to the intermediate shafts 22, 24, transfer gear shaft 28, countershaft 26 and synchronizers 110, 112, 114, 116, 118, 120, and 122 are the same as described above with respect to the first embodiment.

More specifically, gear set 50 including gears 52 and 54 are arranged as follows: gear 52 is connected for common rotation with second intermediate shaft 24 and intermeshes with gear 54. Gear 54 is selectively connectable for common rotation with countershaft shaft 26 by synchronizer 110. Gear set 80A includes gears 82, 84 and 86. Gear 82 is connected for common rotation with second intermediate shaft 24 and intermeshes with gears 84 and 86. Gear 84 is selectively connectable for common rotation with output shaft 14 by synchronizer 120 and intermeshes with gear 86. Gear 86 is rotatably supported by idler shaft I and intermeshes with gear 86. Gear set 80A provides a reverse gear ratio. Further, an additional gear set 80B is provided that includes gears 88 and 89. Gear 88 is connected for common rotation with first intermediate shaft 22 and intermeshes with gear 89. Gear 89 is selectively connectable for common rotation with output shaft 14 by synchronizer 126. Gear set 80B is disposed adjacent wall 25 and provides a second gear ratio.

Additionally, the present embodiment provides a transfer shaft and pinion gear 704 supported by wall 25 for rotation about countershaft 26. Transfer shaft and pinion gear 704 is selectively connectable to counter shaft 26 through the engagement of a synchronizer 128. Transfer shaft and pinion gear 704 intermeshes with gear 92 of gear set 90 to selectively transfer torque from countershaft 26 to output shaft 14.

The transmission 700 is capable of transmitting torque from the input shaft 12 to the output shaft 14 in at least seven forward torque ratios and one reverse torque ratio, as indicated in FIG. 7. Each of the forward torque ratios and the reverse torque ratio is attained by engagement of clutch 30 and one of the clutch elements 34, 36 and one or more of the synchronizers 110, 112, 114, 116, 118, 120, 122, 124, 126 and 128. Those skilled in the art will readily understand that a different speed ratio is associated with each torque ratio and how these torque ratios are achieved, based on the description of transmission 10.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member;
   first, second, third, fourth, and fifth co-planar gear sets each having a first gear member intermeshed with a second gear member, and wherein the third and fourth gear sets each include a third gear member intermeshed with the first gear member;
   a first intermediate member continuously interconnected with a first plurality of the first gear members;
   a second intermediate member concentric with the first intermediate member and continuously interconnected with a second plurality of the first gear members;
   a countershaft selectively connectable with a first plurality of the second and third gear members;
   an output member selectively connectable with a second plurality of the second and third gear members;
   a torque transmitting assembly selectively engageable to interconnect the input member with at least one of the first and second intermediate members;
   four synchronizer assemblies for selectively coupling the second and third gear members of the first, second, third, fourth, and fifth gear sets with one of the countershaft and the output member;
   a first transfer gear set interconnected between the countershaft and the output member for transferring torque from the countershaft to the output shaft, and
   wherein the torque transmitting assembly and four synchronizer assemblies are selectively engageable in combinations of at least two to establish at least seven forward speed ratios and at least one reverse speed ratio between the input member and the output member.

2. The transmission of claim 1 wherein the four synchronizer assemblies include a first synchronizer assembly for selectively coupling one of the second gear of the first gear set and the second gear of the third gear set with the countershaft.

3. The transmission of claim 2 wherein the four synchronizer assemblies include a second synchronizer assembly for selectively coupling one of the second gear of the fourth gear set and the second gear of the fifth gear set with the countershaft.

4. The transmission of claim 3 wherein the four synchronizer assemblies include a third synchronizer assembly for selectively coupling one of the second gear of the second gear set and the third gear of the third gear set with the output member.

5. The transmission of claim 4 wherein the fifth gear set includes an idler gear and a third gear, wherein the idler gear is intermeshed with the first gear of the fifth gear set and the third gear of the fifth gear set, and wherein the idler gear is rotatable about an idler axis.

6. The transmission of claim 5 wherein the four synchronizer assemblies include a fourth synchronizer assembly for selectively coupling one of the third gear of the fourth gear set and the third gear of the fifth gear set with the output member.

7. The transmission of claim 1 wherein the torque transmitting assembly is a dual clutch having a first hub connected to the first intermediate member and a second hub connected to the second intermediate member.

8. The transmission of claim 7 wherein the first hub is remote from the second hub, and wherein the output member is interconnected to an output shaft of a final drive unit, and wherein the output shaft of the final drive unit is perpendicular to the input member and is disposed between the first hub and the second hub.

9. The transmission of claim 7 wherein the torque transmitting assembly is located between a first plurality of the gear sets and a second plurality of the gear sets.

10. The transmission of claim 9 wherein the first plurality of gear sets includes the first, second, and third gear sets, and wherein the second plurality of gear sets includes the fourth and fifth gear sets.

11. The transmission of claim 1 further comprising a transfer gear shaft axially aligned with the input member and a second transfer gear, wherein the first transfer gear includes a first gear member interconnected to the transfer gear shaft and a second gear member intermeshed with the first gear member of the first transfer gear and interconnected to the countershaft, and wherein the second transfer gear includes a first gear member interconnected to the transfer gear shaft and a second gear member intermeshed with the first gear member of the second transfer gear and interconnected to the output member.

12. The transmission of claim 11 wherein the input member is rotatingly fixed to one of the first intermediate member and the second intermediate member and the torque transmitting assembly includes a clutch for selectively coupling the input member to the other of the first intermediate member and the second intermediate member.

13. The transmission of claim 12 further comprising a fifth synchronizer for selectively coupling the second gear of the first transfer gear to the countershaft.

14. The transmission of claim 12 further comprising a clutch for selectively coupling the second gear of the first transfer gear to the countershaft.

15. The transmission of claim 1 further comprising a transfer gear shaft axially offset from the input member, wherein the first transfer gear includes a first gear, a second gear, and a third gear, and wherein the first gear is interconnected with the transfer gear shaft and is intermeshed with the second gear and the third gear, the second gear is interconnected with the countershaft, and the third gear is interconnected with the output member.

16. The transmission of claim 1 further comprising a first wall, a second wall, and a third wall, wherein the second wall is located between the first and third walls.

17. The transmission of claim 16 wherein the first, second, third, fourth, and fifth gear sets are located between the first and second walls and the first transfer gear is located between the second and third walls.

18. The transmission of claim 17 further comprising a fourth wall, wherein the fourth and fifth gear sets are located between the first and fourth walls and the first, second, and third gear sets are located between the fourth and second walls.

19. The transmission of claim 1 wherein the first transfer gear includes a drive sprocket, a driven sprocket, and transfer member, wherein the drive sprocket is interconnected with the countershaft, the driven sprocket is interconnected with the output member, and the transfer member is engaged with both the drive sprocket and the driven sprocket for transferring torque from the drive sprocket to the driven sprocket.

20. The transmission of claim 1 further comprising a transfer gear shaft axially aligned with the input member and a second transfer gear, wherein the first transfer gear includes a first gear member interconnected to the transfer gear shaft and a second gear member intermeshed with the first gear member of the first transfer gear and interconnected to the countershaft, and wherein the second transfer gear includes a first gear member interconnected to the transfer gear shaft, a second gear member intermeshed with the first gear member of the second transfer gear and interconnected to the output member, and a transfer pinion intermeshed with the first gear of the second transfer gear that is selectively connectable to the countershaft.

21. The transmission of claim 20 wherein the four synchronizer assemblies include a first synchronizer assembly for selectively coupling the second gear of the second gear set to the countershaft.

22. The transmission of claim 21 wherein the four synchronizer assemblies include a second synchronizer assembly for selectively coupling one of the second gear of the first gear set and the second gear of the third gear set with the countershaft.

23. The transmission of claim 22 wherein the four synchronizer assemblies include a third synchronizer assembly for selectively coupling one of the second gear of the fourth gear set and the transfer pinion of the second transfer gear with the countershaft.

24. The transmission of claim 23 further comprising an idler gear set that includes a first gear, a second gear, and an idler gear, wherein the first gear is interconnected with the second intermediate member, the second gear is selectively connectable to the output member, and the idler gear is rotatable about an idler axis and is intermeshed with both the first gear and the second gear of the idler gear set.

25. The transmission of claim 24 wherein the four synchronizer assemblies include a fourth synchronizer assembly for selectively coupling one of the third gear of the third gear set and the second gear of the idler gear set with the output member.

* * * * *